No. 760,612. PATENTED MAY 24, 1904.
J. R. CARTER.
WASHING MACHINE.
APPLICATION FILED JAN. 6, 1902.
NO MODEL. 3 SHEETS—SHEET 1.
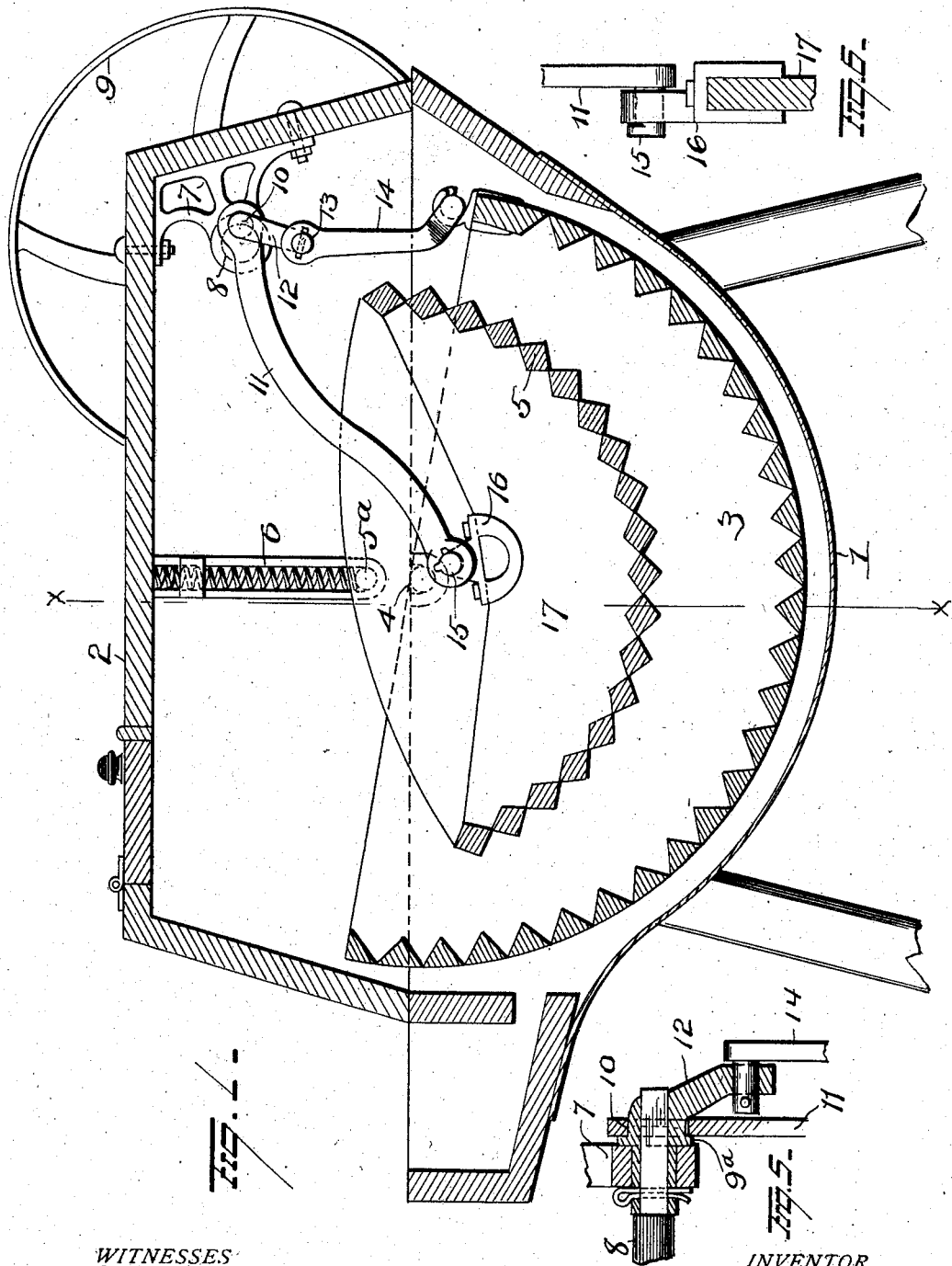
WITNESSES
E. J. Nottingham
G. F. Downing
INVENTOR
J. R. Carter
By H. A. Seymour
Attorney No. 760,612. PATENTED MAY 24, 1904.
J. R. CARTER.
WASHING MACHINE.
APPLICATION FILED JAN. 6, 1902.
NO MODEL. 3 SHEETS—SHEET 2.
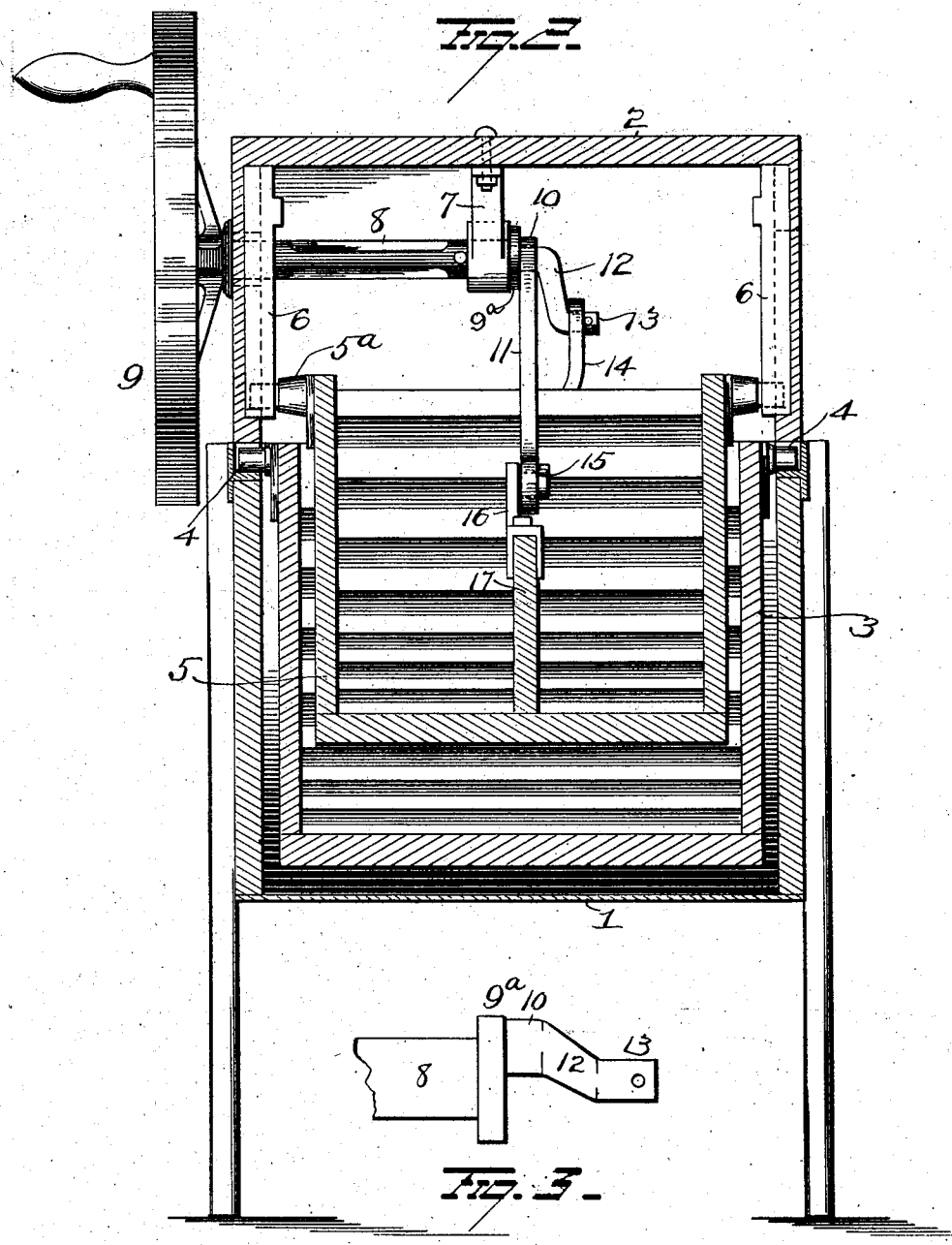
WITNESSES
INVENTOR No. 760,612. PATENTED MAY 24, 1904.
J. R. CARTER.
WASHING MACHINE.
APPLICATION FILED JAN. 6, 1902.
NO MODEL. 3 SHEETS—SHEET 3.
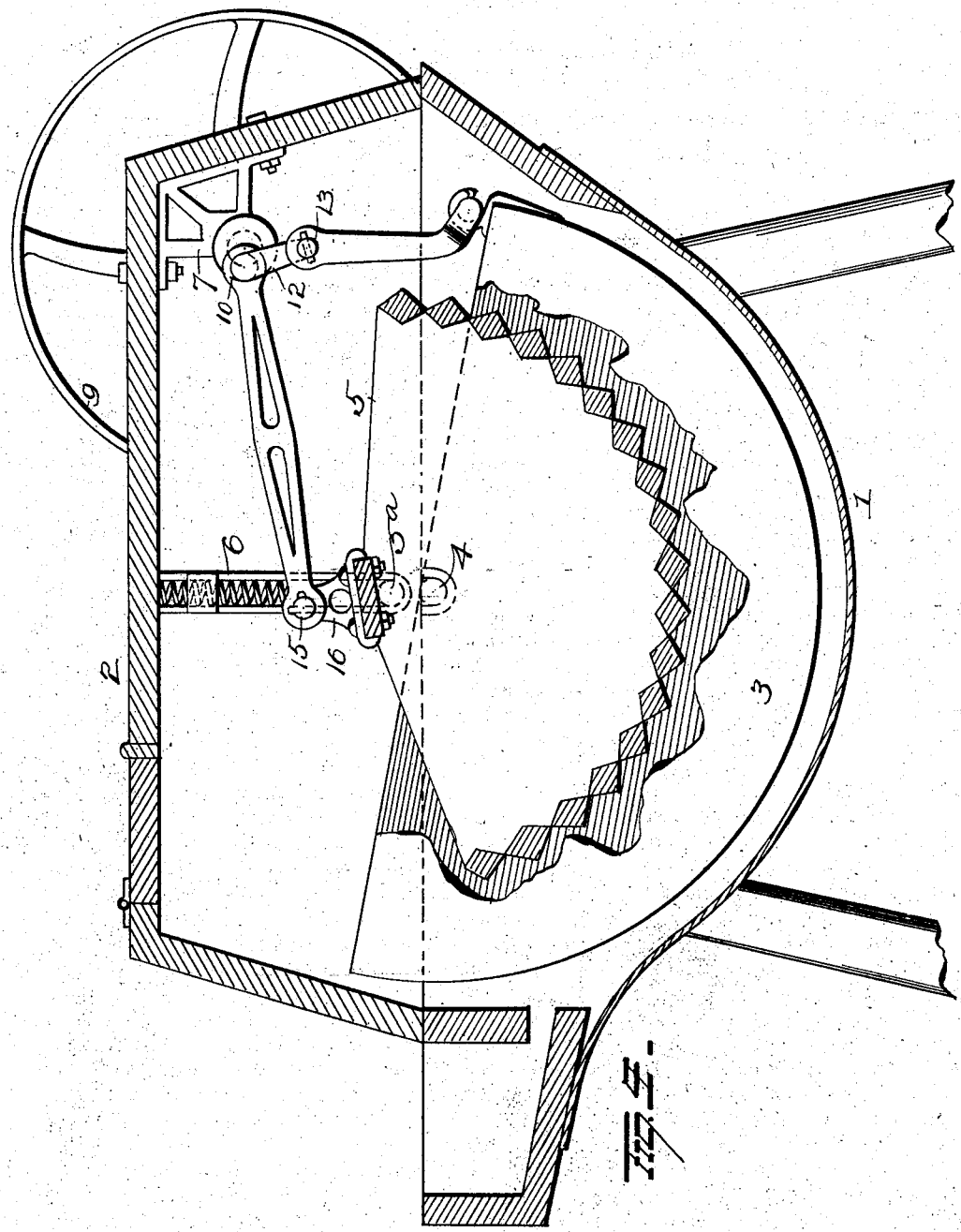

No. 760,612.

Patented May 24, 1904.

UNITED STATES PATENT OFFICE.

JOHN R. CARTER, OF AUGUSTA, KENTUCKY, ASSIGNOR TO ERNST H. HUENEFELD, OF CINCINNATI, OHIO.

WASHING-MACHINE.

SPECIFICATION forming part of Letters Patent No. 760,612, dated May 24, 1904.

Application filed January 6, 1902. Serial No. 88,640. (No model.)

*To all whom it may concern:*

Be it known that I, JOHN R. CARTER, a resident of Augusta, in the county of Bracken and State of Kentucky, have invented certain new and useful Improvements in Washing-Machines; and I do hereby declare the following to be a full, clear, and exact description of the invention, such as will enable others skilled in the art to which it appertains to make and use the same.

My invention relates to an improvement in washing-machines, the object of the invention being to provide improved operating mechanism for continuously reciprocating the upper and lower rubbers in opposite directions.

A further object is to provide a washing-machine having upper and lower rubbers with improved operating mechanism inclosed in the cover of the machine and adapted to continuously reciprocate said rubbers in opposite directions and insure uniform movement of the rubbers.

With these objects in view the invention consists in certain novel features of construction and combinations and arrangements of parts, as will be more fully hereinafter described, and pointed out in the claims.

In the accompanying drawings, Figure 1 is a view in section illustrating my improvements. Fig. 2 is a view in section taken on the line $x$ $x$ of Fig. 1, and Fig. 3 is an enlarged detail view. Fig. 4 is a view of a modified form of my invention. Figs. 5 and 6 are views of other modifications.

1 represents the tub or body of the washing-machine, and 2 a cover hinged thereon. The lower rubber 3 is provided with trunnions 4, mounted to reciprocate in bearings in the body, and the upper rubber 5 is provided with trunnions $5^a$, supported in elongated bearings 6 in the cover, and springs are located in the bearings 6 and exert a yielding pressure on the upper rubber to hold the same down upon the articles to be washed.

In the cover 2 at its hinged end a metal bracket 7 is secured and is made with a bearing for a crank-shaft 8, extending through one side of the cover and having a hand-wheel 9 (or other operating device) secured on the outer end of the shaft.

On the inner end of shaft 8 a crank-arm $9^a$ is located and has a crank-pin 10 at its outer end for a pitman 11, and another crank-arm 12 is made integral with crank-pin 10 and projects at an angle of about forty-five degrees to the arm $9^a$ and has a crank-pin 13 at its free end for a pitman 14. These crank-pins 10 and 13 are disposed at an angle of about ninety degrees with respect to the axis of the crank-shaft 8, taking the axis of said shaft as the apex of the angle, and the pin 13 is located a greater distance from the shaft than pin 10 to give a longer stroke to pitman 14 than is given to pitman 11, so as to cause the upper and lower rubbers to move the same distance.

While I have shown and described the shaft 8, arms $9^a$ 12, and pins 10 and 13 as integral parts, it will be understood that they may, if desired, constitute separate parts secured together, and that the pin 13 may form a part of pitman 14 and project through a hole or bearing in arm 12.

The pitman 11, above referred to, is preferably curved, as shown, and is provided on its end with a hole or bearing to receive a lug or pintle 15 on a bracket 16, secured to a standard 17, fixed to the upper rubber. This lug or pintle is preferably located at a point below the horizontal plane of the pivotal point of the upper rubber. Of course, if preferred, a lug or pintle may be located on the pitman, and a bearing to receive the same might be secured to the standard, and various other forms of pivotal connection might be employed.

The pitman 14 is pivotally connected to one end of the lower rubber, so that the rotation of the crank-shaft will simultaneously reciprocate the rubbers in opposite directions.

It will be seen that by constructing the washing-machine as above described the upper and lower rubbers are both connected directly to the crank-shaft by pitmen, and by locating the crank-arms and pins out of alinement with each other and at approximately the angle explained the rubbers are simultaneously reciprocated in opposite directions always the same distance and never permitting them to remain at a standstill nor move together in the same direction.

Instead of pivotally connecting the pitman 11 with the upper rubber 5 at a point below the horizontal plane of the pivotal point of the upper rubber I might, as shown in Fig. 4, project the standard above the plane of the pivotal point of the rubber and connect the pitman to the upper end of the standard. When the pitman is thus connected, it is necessary to reverse the positions of the crank-arms, as clearly shown, so as to reciprocate the rubbers in opposite directions.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a washing-machine, the combination with upper and lower rubbers, both pivotally mounted to oscillate, one within the other, of a shaft provided with two crank-arms located different distances laterally from the axis of the shaft and at different angles relatively to each other, a pitman connecting one of the cranks with the upper rubber and another pitman connecting the other crank with the lower rubber.

2. In a washing-machine, the combination with upper and lower rubbers, both pivotally supported, of a shaft terminating within the machine, crank-arms at the end of the shaft within the machine, said crank-arms located laterally from the axis of the shaft and at an angle to each other, a pitman connecting one of said crank-arms with one end of the lower rubber and another pitman connecting the other crank-arm with the upper rubber at a point near the pivotal support of the latter, both of said pitmen being located within the machine.

3. In a washing-machine, the combination with a body and a cover therefor, a lower rubber pivotally mounted in the body and an upper rubber pivotally mounted in the cover, of a shaft mounted to rotate in the cover, crank-arms on said shaft disposed at an angle to each other, pins on the crank-arms out of alinement with each other and disposed at different angles from the shaft, a pitman connecting one of said pins with one end of the lower rubber, an upright in the upper rubber, and a pitman pivotally connected at one end to the other crank-pin and at its other end to the upright, and means fixed to said shaft for rotating it.

4. In a washing-machine, the combination with a body and a cover therefor, a lower rubber pivotally mounted in the body and an upper rubber pivotally mounted in the cover, of a shaft mounted to rotate within the cover, crank-arms on the shaft located within the cover and at an angle to each other and laterally at different angles from the shaft, a pitman connecting one of said crank-arms with one end of the lower rubber, and another pitman connected at one end to the other arm and at its other end to the upper rubber.

5. In a washing-machine, the combination with a body and a cover therefor, a lower rubber pivotally mounted in the body and an upper rubber pivotally mounted in the cover, of a shaft mounted to rotate within the cover, crank-arms on said shaft located within the cover, a pitman located within the cover and connecting one of said crank-arms with one end of the lower rubber, another pitman also located within the cover and connected at one end to the other crank-arm and at its other end to the upper rubber below the horizontal plane of the pivotal point of the upper rubber.

6. In a washing-machine, the combination with a body and a cover therefor, a lower rubber pivotally mounted in the body, and an upper rubber pivotally mounted in the cover, of a shaft mounted to rotate within the cover, two crank-arms on said shaft disposed at different angles from the shaft and at different angles to each other, and two pitmen located within the cover, one of said pitmen connecting one of said crank-arms with the upper rubber and the other pitman connecting the other crank-arm with the lower rubber.

In testimony whereof I have signed this specification in the presence of two subscribing witnesses.

JOHN R. CARTER.

Witnesses:
S. W. FOSTER,
R. S. FERGUSON.